United States Patent
Wo et al.

(10) Patent No.: US 7,215,522 B2
(45) Date of Patent: May 8, 2007

(54) POWER MODULE OF FIELD EMISSION DISPLAY AND METHOD OF POWER GENERATION THEREOF

(75) Inventors: Chi-Hao Wo, Taipei (TW); Wei-Chi Yao, Taipei (TW); Jia-Hung Wu, Taipei (TW); Kuei-Wen Cheng, Taipei (TW)

(73) Assignee: Teco Nanotech Co., Ltd., Taipei (TW)

( * ) Notice: Subject to any disclaimer, the term of this patent is extended or adjusted under 35 U.S.C. 154(b) by 462 days.

(21) Appl. No.: 10/770,531

(22) Filed: Feb. 4, 2004

(65) Prior Publication Data

US 2005/0168898 A1   Aug. 4, 2005

(51) Int. Cl.
*H02H 3/20* (2006.01)
*G09G 3/10* (2006.01)
(52) U.S. Cl. .................... 361/91.1; 315/169.1
(58) Field of Classification Search ............... 361/91.1; 323/282; 315/169.1
See application file for complete search history.

(56) References Cited

U.S. PATENT DOCUMENTS

| | | | | | |
|---|---|---|---|---|---|
| 6,031,748 | A | * | 2/2000 | Hong | 363/89 |
| 6,034,479 | A | * | 3/2000 | Xia | 315/169.1 |
| 2005/0013143 | A1* | | 1/2005 | Kim et al. | 363/20 |
| 2005/0052170 | A1* | | 3/2005 | Kim et al. | 323/282 |

* cited by examiner

*Primary Examiner*—Brian Sircus
*Assistant Examiner*—Boris Benenson
(74) *Attorney, Agent, or Firm*—Troxell Law Office, PLLC

(57) ABSTRACT

A power module for a field emission display and a method of power generation are described. More particularly, the power module and method of power generation both are for the field emission display in diode structure. The power module has a direct current (DC) power source, a pulse width modulation circuit connected to the DC power source for generating a pulse width modulation signal, an electronic switch connected to the pulse width modulation circuit for receiving the modulation signal so as to convert the DC power into a high-frequency alternating power supplied to the primary side of a transformer. Moreover, the second side of the transformer generates a high-voltage and a high-frequency power source to the field emission display.

10 Claims, 4 Drawing Sheets

POWER MODULE OF FIELD EMISSION DISPLAY AND METHOD OF POWER GENERATION THEREOF

BACKGROUND OF THE INVENTION

1. Field of the Invention

The present invention relates to a power module of a field emission display and the method of power generation of the power module, and more particularly, to a power module of a field emission display and the method of power generation of the power module in which the field emission display is in a diode structure.

2. Description of the Prior Art

The surge of field emission display (FED) makes the planarization of cathode-ray tube (CRT) possible. The way the field emission display operates is similar to that of conventional cathode-ray tube, both of which emit electrons through a vacuum space, after which anodes accelerate these electrons to stimulate the phosphors so as to generate light. The phosphors for both FEDs and CRTs have the same characteristic. The major difference therebetween lies in the way electrons are generated, where a CRT generates electrons by heating the cathode while FED employs an electric field to attract electrons from the cathode.

Reference is made to FIG. 1, a cross-sectional view of a power source and a device of conventional diode FED with a micro acute end in metal. The conventional diode FED 1 with a micro acute end in metal has a stable DC power source 19 as a driving power, which connects to the anode layer 10 and cathode layer 14 of FED. When the DC power source is on, the emission layer 16 connected to the cathode layer 14 generates electrons and the DC power source 19 accelerates electrons to destroy the phosphors layer 12 coated on the anode layer 10, thereby stimulating phosphors units of the phosphors layer 12 to generate light. Additionally, an insulating layer 18 is placed for blocking electrons generated between each emission layer 16 to avoid mutual interference of these electrons. The emission layer 16 is a micro acute end in metal.

Reference is made to FIG. 2, a cross-sectional view of a power source and device of a conventional diode carbon nano-tube field emission display. The conventional diode carbon nano-tube FED 2 differs from the conventional diode FED 1 in having a micro acute end in metal with the field emission layer 16. In other words, the field emission layer in FED 1 in FIG. 1 is in metal while the field emission layer of FED 2 is composed of a carbon nano-tube.

Regardless of the characteristic of the field emission layers of above two field emission displays, both take advantage of DC power source 19 for the purpose of light generation. There are active and passive ways of driving field emission displays, in which the active method is adopted in thin-film manufacturing process having disadvantages of the use of comparatively more expensive manufacturing devices, complicated steps of manufacturing process and yield rate when applicable to medium or large-size panel manufacturing. On the other hand, the passive driving method provides a positive voltage differential impulse circuit with the disadvantage of inferior brightness performance, or a DC voltage differential circuit to the anode and cathode layers of the diode structure with the disadvantage of a shorter lifetime duration due to the continuing low voltage/high current situation leading to overheating of the panel device and circuitry.

Additionally, the required driving voltages between anodes and cathodes of conventional field emission displays are greater than 200 volts, resulting in the use of more expensive and complicated driving integrated circuits.

SUMMARY OF THE INVENTION

It is therefore a primary objective of the present invention to provide a power module and a method of power generation of the power module. By providing a high-frequency alternating current power source to a predetermined position between anode and cathode layers of the field emission display, the current density of the field emission layer is increased and the lighting efficiency of the phosphors layer is efficiently improved without overheating the panel in order to extend the lifetime of the display.

In accordance with claimed invention, a power module providing power for a field emission display includes a direct current (DC) power source, a pulse width modulation circuit connected to the DC power source for generating a modulation signal, an electronic switch connected to the pulse width modulation circuit for receiving the modulation signal so as to switch the power supplied to the field emission display and an amplifier connected to the DC power source and the electronic switch for amplifying the power.

The present invention forms a positive electric field required by electrons of the field emission layer and a negative electric field with a direction as opposed to that of the positive electric field by the setting of AC power source. The negative electric field is for the purpose of protection, therefore preventing ion bombardment back to the emission layer after hitting the phosphors layer and subsequent damages to the emission layer.

Because of having the AC power source provided to the predetermined position between the anode and cathode layers, stimulated or accumulated electric charges are released, thus avoiding accumulation of too many electric charges on the anode layer. Furthermore, high-frequency alternating electrons stimulate the phosphors layer, leading to no overheating after continuous lighting, therefore extending the lifetime of the field emission display.

These and other objectives of the present invention will undoubtedly become obvious to those of ordinary skill in the art after reading the following detailed description of the preferred embodiment that is illustrated in the various figures and drawings.

BRIEF DESCRIPTION OF THE DRAWINGS

The foregoing aspects and many of the attendant advantages of this invention will be more readily appreciated as the same becomes better understood by reference to the following detailed description, when taken in conjunction with the accompanying drawings, wherein.

DETAILED DESCRIPTION OF THE PREFERRED EMBODIMENT

Figure 1:
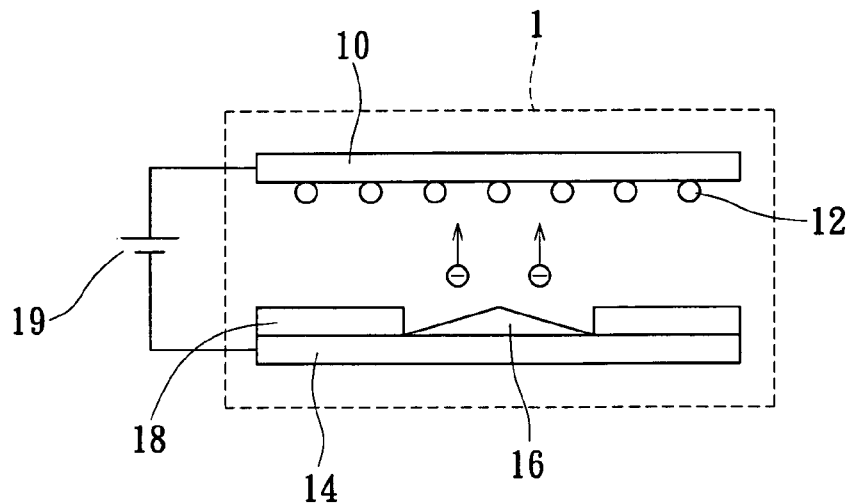
FIG. 1 is a cross-sectional view of a power module of a conventional metal micro acute end field emission display in diode structure.
Figure 2:
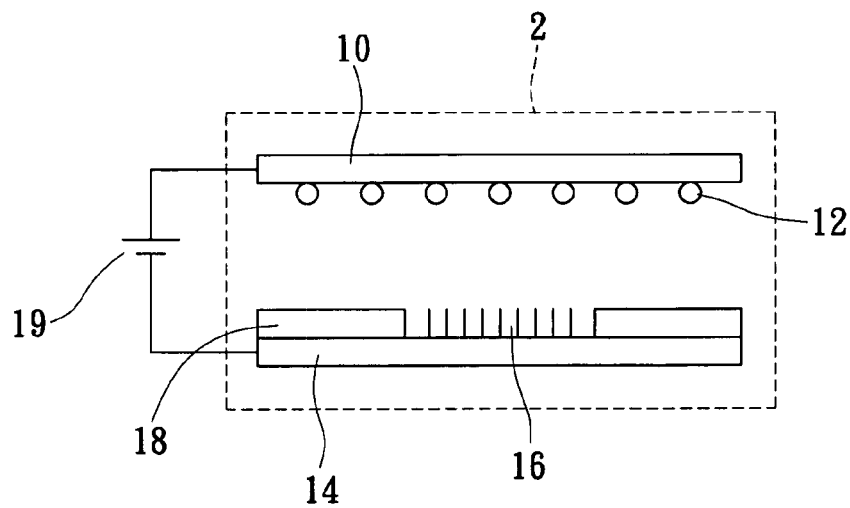
FIG. 2 is a cross-sectional view of a power module of a conventional carbon micro tube field emission display in diode structure.
Figure 3:
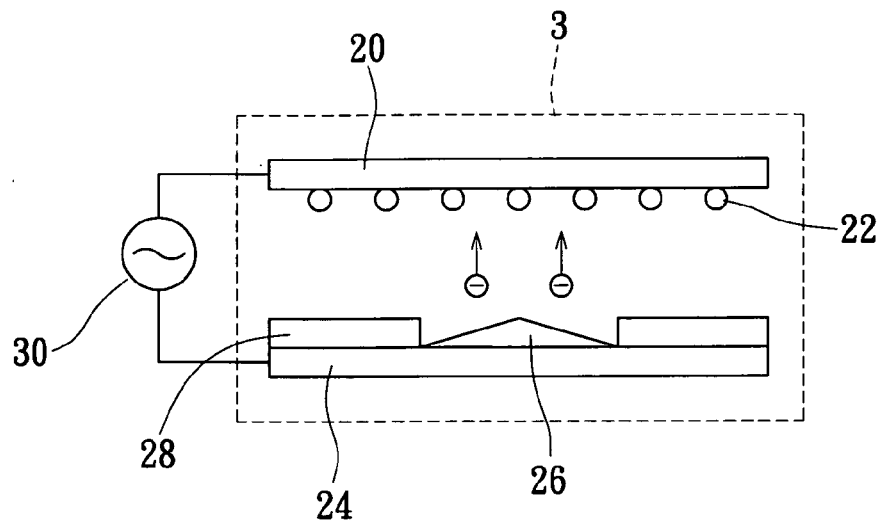
FIG. 3 is a cross-sectional view of a power module of a metal micro acute end field emission display in diode structure according to the present invention.

Reference is made to FIG. 3, which illustrates a cross-sectional view of a power module for a micro acute metal end field emission display in a diode structure according to the present invention. The diode structured field emission display 3 employs an alternating power source 30 with high frequencies and voltages as a driving source. The alternating power source 30 connects the anode and cathode layers 20 and 24 of the field emission display 3. When the alternating power source 30 is positive, the emission layer 26 of the cathode layer 24 generates electrons. These electrons are accelerated by the alternating power source 30 between the anode and cathode layers 20 and 24 to excite phosphors layer 22 on the anode layer 20 so as to incite the phosphors units of the florescent layer 22 emit lights. When the alternating power source 30 is a negative electric field, electrons are limited to not reflect to the emission layer 26 after hitting the phosphors layer 22. Additionally, not many electric charges accumulate on the anode layer 20 so as to prevent overheating of the phosphors layer 22 because of its continuous lighting. Meanwhile, with the use of insulating layer 28, electrons of every emission layer 26 are blocked from others, preventing mutual interference therebetween. The emission layer 26 is a metal micro acute end in structure.

Figure 4:
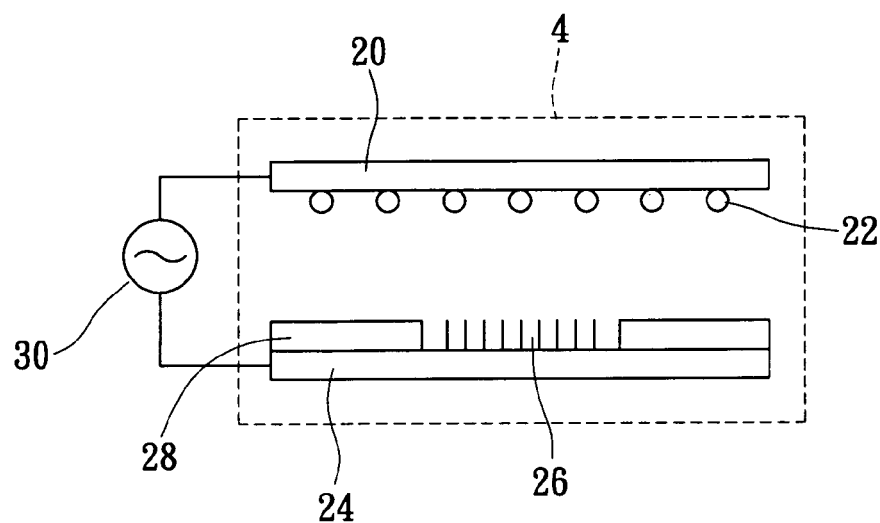
FIG. 4 is a cross-sectional view of a power module of a carbon nano-tube field emission display in diode structure according to the present invention.

Reference is made to FIG. 4, which illustrates a cross-sectional view of a power source of a carbon nano-tube field emission display in diode structure according to the present invention. The carbon nano-tube field emission display 4 differs from the micro acute end field emission display in FIG. 3 by the emission layer 26, which is composed of a carbon nano-tube in the embodiment of FIG. 4.

The present invention uses a alternating current power source 30 having frequencies at least 10,000 hertz and voltages having a swing of minus 300 volts to positive 300 volts to drive every kind of field emission display to light. The alternating current power source 30 adjusts in accordance with the requirement and lighting efficiency. The preferred lighting efficiency lies in frequencies ranging from 12,000 to 14,000 hertz.

Figure 5:
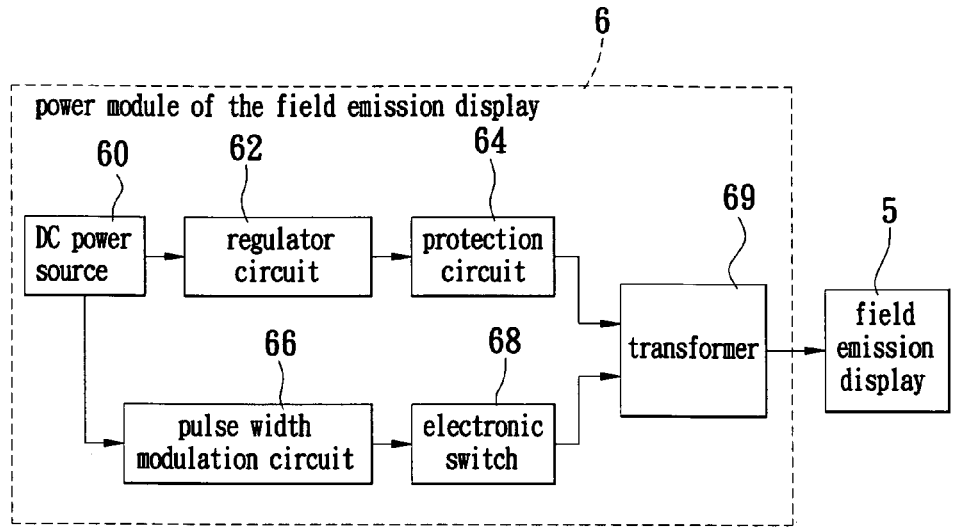
FIG. 5 is a circuit block diagram of the power module of the field emission display according to the present invention.
Figure 6:
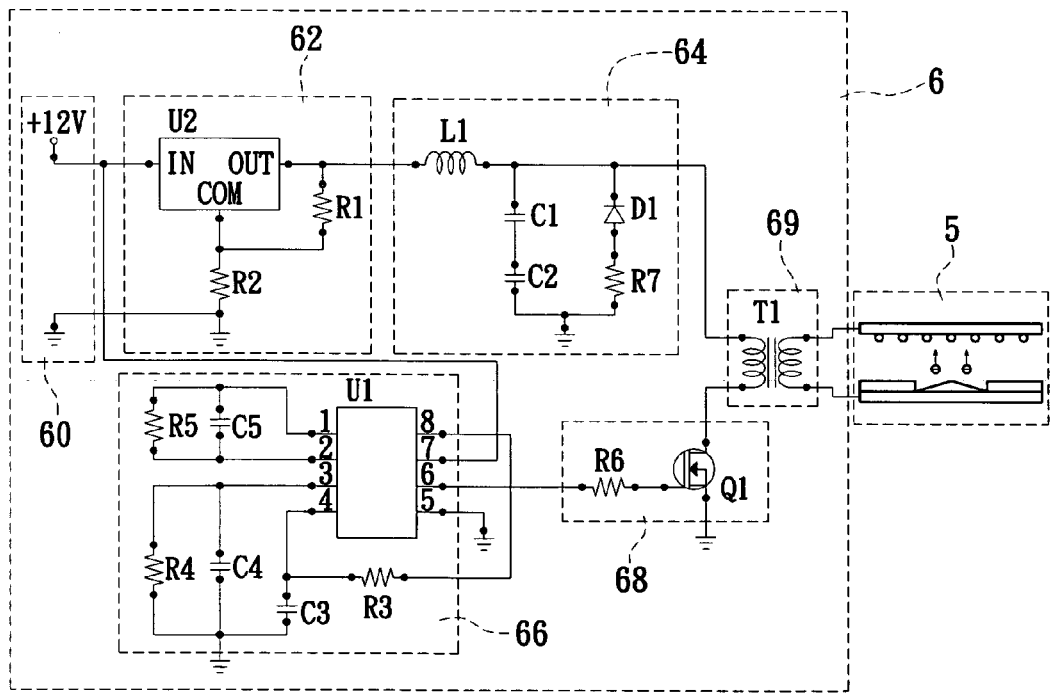
FIG. 6 is a circuit diagram of the power module of the field emission display according to the present invention.

Reference is made to FIG. 5 in conjunction with FIG. 6 showing a circuit block diagram of the power module of the field emission display according to the present invention. The power module 6 includes a DC power source 60, a regulator circuit 62, a protection circuit 64, a pulse width modulation circuit 66, an electronic switch 68 and an amplifier 69. The regulator circuit 62 is an assembly composed of the resistors R1–R2 and the chip U2. The protection circuit 64 is an assembly composed of the inductor L1, the capacitors C1–C2, the resistor R7 and the diode D1. The pulse width modulation circuit 66 is assembly composed of the resistors R3–R5, the capacitors C3–C5, and the chip U1. The electronic switch 68 is an assembly composed of the resistor R6 and the switch Q1.

The DC power source 60 connects the regulator circuit 62 and pulse width modulation circuit 66 to provide power for the field emission display 5. The regulator circuit 62 stabilizes the DC power source 60 by the chip U2 and connects the protection circuit 64 serving to protect the whole circuitry from excessive voltages and currents by the inductor L1 and the diode D1. The transformer 69 with a primary side and a second side, wherein the one terminal of the primary side of the transformer 69 connects to the protection circuit 64, and the second side of the transformer 69 connects to the field emission display 5.

The pulse width modulation circuit 66 generates modulation signals based on the DC power source 60. The electronic switch 68 connected to the pulse width modulation circuit 66 and another terminal of the primary side of the transformer 69, wherein the electronic switch 68 is controlled by the modulation signal so as to convert the stable DC power into a high-frequency alternating power supplied to the primary side of the transformer 69.

The transformer 69 converts the high-frequency alternating power into a high-voltage and high frequency alternating power to the field emission display 5. The transformer refers to a high-frequency transformer T1.

One end of the high-frequency transformer T1 connects to the anode layer of the field emission display 5 while the other end thereof connects to the cathode layer, for providing the alternating power.

Figure 7:
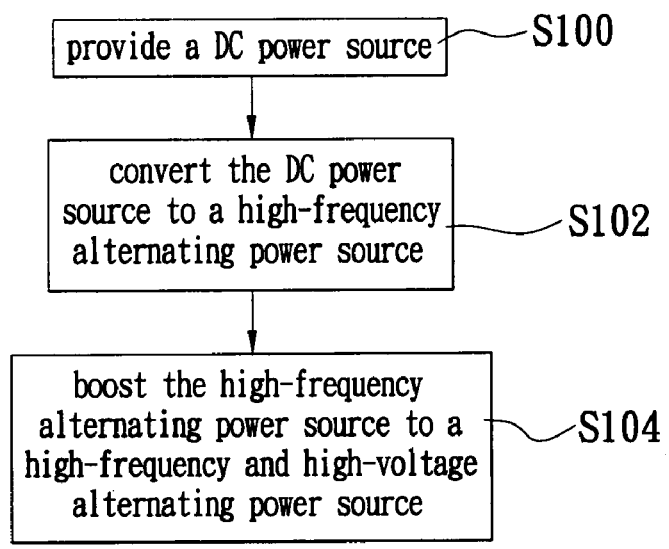
FIG. 7 is a flow chart illustrating the power generation method according to the present invention.

Reference is made to FIG. 7, which is a flow chart illustrating the power generation method of the power module of the field emission display. The method includes steps as follows: provide a DC power source (S100), convert the DC power source to a high-frequency alternating power source (S102) and boost the high-frequency alternating power source to a high-frequency and high-voltage alternating power source (S104).

Reference is made to FIG. 5 in conjunction with FIG. 7. The power generation method first provides a DC power source 60, and then the regulator circuit 62 boosts the DC power source 60 to a high-frequency DC power source. At the same time, the pulse width modulation circuit 66 generates pulse width modulation signals to control the switching of the electronic switch 68, further to convert the high-frequency DC power source into a high-frequency alternating power source. The alternating power is amplified by the transformer 69 to generate a high-voltage and high-frequency alternating power source and then send the same to the predetermined position between the anode and cathode of the field emission display 5, thereby providing alternating power to make the cathode layer emit electrons and let these electrons alternately hit the anode layer to emit light alternately.

The high frequency and high-voltage alternating power source has frequencies over 10,000 hertz and voltage levels ranging from negative 300 to positive 300 volts. The best lighting efficiency comprises frequencies of the alternating power source ranging from 12,000 to 14,000 hertz.

In contrast to the prior art, the present invention relies on an alternating power source having high frequencies and voltages to improve lighting efficiency without overheating the display to extend the lifetime of the display. Meanwhile, the negative electric field of the alternating power provides a protection mechanism by limiting the kinetic energy of electrons bouncing back to the emission layer after they hit the phosphors layer, efficiently lessening damages to the emission layer and thus extending the lifetime of the display as well.

Those skilled in the art will readily observe that numerous modifications and alterations of the device may be made while retaining the teachings of the invention. Accordingly, the above disclosure should be construed as limited only by the metes and bounds of the appended claims.

What is claimed is:

1. A power module providing power for a field emission display, comprising:
   a direct current (DC) power source;
   a regulator connected to the DC power source for supplying a stable DC power;
   a protection circuit connected to the regulator for protection from excessive voltages and currents of the stable DC power;
   a transformer with a primary side and a second side, wherein the one terminal of the primary side of the transformer connects to the protection circuit, and the second side of the transformer connects to the field emission display;
   a pulse width modulation circuit for generating a modulation signal; and
   an electronic switch connected to the pulse width modulation circuit and another terminal of the primary side of the transformer, wherein the electronic switch is controlled by the modulation signal so as to convert the stable DC power into a high-frequency alternating power supplied to the primary side of the transformer.

2. The power module of claim 1, wherein the field emission display comprises a cathode layer connected to one end of the amplifier and an anode layer connected to another end of the amplifier.

3. The power module of claim 2, further comprising a phosphors layer upon the anode layer.

4. The power module of claim 2, further comprising an emission layer upon the cathode layer.

5. The power module of claim 4, wherein the emission layer is a micro acute end in metal.

6. The power module of claim 4, wherein the emission layer is a carbon micro-tube.

7. A method for generating power to a power module of a field emission display, the method comprising:
   providing a DC power source;
   switching the DC power source to a high-frequency alternating power source; and
   boosting the high-frequency alternating power source to a high-voltage and a high-frequency power source, and sending the high-voltage and high-frequency alternating power source between a cathode and anode of the field emission display so as to have the cathode generate electrons and further have the electrons hit the anode to generate light alternately.

8. The power generating method of claim 7, wherein the high-frequency alternating power source comprises frequencies over about 10,000 hertz.

9. The power generating method of claim 7, wherein the high-voltage and high frequency alternating power source comprises frequencies between about 12,000 and 14,000 hertz.

10. The power generating method of claim 7, wherein the high-voltage and high frequency alternating power source comprises voltage levels between about negative 300 to positive 300 volts.

* * * * *